United States Patent
McDonald

(10) Patent No.: US 7,290,748 B2
(45) Date of Patent: Nov. 6, 2007

(54) BREAKAWAY SUPPORT FOR OVERHEAD LINES

(76) Inventor: Richard Alan McDonald, 13430 Black Gum Ct., Chantilly, VA (US) 20151

( * ) Notice: Subject to any disclaimer, the term of this patent is extended or adjusted under 35 U.S.C. 154(b) by 0 days.

(21) Appl. No.: 10/684,851

(22) Filed: Oct. 15, 2003

(65) Prior Publication Data

US 2005/0081458 A1     Apr. 21, 2005

(51) Int. Cl.
    *E04B 1/00*    (2006.01)
    *E04C 1/00*    (2006.01)
    *E04H 12/24*    (2006.01)

(52) U.S. Cl. .......................... 248/548; 52/98; 52/149; 403/328

(58) Field of Classification Search ........... 52/98–100, 52/146–152, 223.13, 223.14, 736.1, 736.2, 52/712, 701, 703, 705–706; 248/62, 548, 248/549, 694, 1; 174/40 R, 45 R, 45 TD; 439/155, 258, 474, 296, 352; 403/328, 362, 403/475, 390, 400
See application file for complete search history.

(56) References Cited

U.S. PATENT DOCUMENTS

| | | | | |
|---|---|---|---|---|
| 1,029,207 A | * | 6/1912 | Megahan | 174/149 R |
| 1,123,342 A | * | 1/1915 | Megahan | 52/724.5 |
| 3,637,244 A | * | 1/1972 | Strizki | 52/98 |
| 3,866,367 A | * | 2/1975 | Strizki | 52/98 |
| 4,306,696 A | * | 12/1981 | Pondman | 248/59 |
| 4,407,601 A | * | 10/1983 | Reeder | 403/25 |
| 4,638,608 A | * | 1/1987 | Coy | 52/98 |
| 4,742,661 A | * | 5/1988 | Burtelson | 52/697 |
| 5,285,480 A | * | 2/1994 | Chennakeshu et al. | 375/348 |
| 5,315,064 A | * | 5/1994 | Andrews | 174/40 TD |
| 5,413,493 A | * | 5/1995 | Hoffman | 439/188 |
| 5,478,250 A | * | 12/1995 | Hoffman | 439/142 |
| 5,649,402 A | * | 7/1997 | Moore | 52/651.02 |
| 5,775,035 A | * | 7/1998 | Papin | 52/100 |
| 5,855,443 A | * | 1/1999 | Faller et al. | 403/2 |
| 6,056,471 A | * | 5/2000 | Dinitz | 403/2 |
| 6,250,835 B1 | * | 6/2001 | Chamel | 403/2 |
| 6,609,345 B2 | * | 8/2003 | Schauf et al. | 52/736.2 |

* cited by examiner

*Primary Examiner*—Jeanette Chapman
(74) *Attorney, Agent, or Firm*—Charles M. Allen; Anthony Tacconi

(57) ABSTRACT

The breakaway support for overhead lines is a coordinated failure control device. The breakaway support for overhead lines sacrifices itself to ensure that the supporting structure is not damaged. The device has an intentional weak link. The breakaway support for overhead lines will release when the overhead line it is supporting receives a stress that exceeds the tensile strength of the weak link in the breakaway support for overhead lines. The stress causes the weak link to fail. The structure is not damaged and a repair crew can quickly affect repairs. It is much cheaper and easier to reconnect an overhead line than it is to replace or repair a structure and then reconnect the overhead line.

14 Claims, 10 Drawing Sheets

Moments taken at Point A

Given: Y" = 5Z"

Moment (M)
M = (X")(x lbs) = (Y")(y lbs) = (Z")(z lbs)

If Y = 5 Z then the load z is 5 times as much as the load y.

BREAKAWAY SUPPORT FOR OVERHEAD LINES

CROSS-REFERENCE TO RELATED APPLICATIONS

Some of the background information was taken from U.S. Pat. No. 6,197,545 filed by Fanucce, Jerome P. and Gorman, James J. on Jun. 4, 2002. U.S. Pat. No. 5,315,064 filed by Andrews, Dean D. on Nov. 8, 1991 was also reviewed. The main purpose of the review was to differentiate this patent application from U.S. Pat. No. 5,315,064. (more simplistic design, designed for high and low voltages, uninterrupted service).

STATEMENT REGARDING FEDERALLY SPONSORED RESEARCH OR DEVELOPMENT

This patent application and the work associated with it were in no way, shape nor form funded or sponsored directly or indirectly by any state, federal or foreign government or entity.

REFERENCE TO SEQUENCE LISTING

Not Applicable.

BACKGROUND OF THE INVENTION

Background: This Breakaway Support for Overhead Lines is an apparatus that is specifically used to mount insulators and overhead lines to structures (poles, towers, crossarm, etc.).[1] The objective is to provide a coordinated failure system. The result of the object is a quicker and less costly restoration of service for the group maintaining the overhead lines. The breakaway support for overhead lines can be used on high voltage lines (greater than 600 volts alternating current or 600 volts direct current) or low voltage lines (less than 600 volts alternating current or 600 volts direct current).

[1] Patent Classification 174, Section I-Class Definition, paragraph 1.

Poles and other structures are used throughout the world to support overhead lines. These lines may be power lines, telephone lines, cable television lines or other lines. In the United States alone approximately 114 Million poles are in service.[2] Every year a certain number of poles and other structures are needlessly destroyed or damaged. Hurricanes, ice storms, trees falling or other trauma impact the lines and their attached structures. Often the line is one of the major trunk lines. Typically these lines are larger in diameter to carry more current or these lines have many individual conductors to carry more communication traffic. As such, these trunk lines have a greater tensile strength than smaller distribution lines. Quite often the tensile strength of these major trunk lines exceeds the structural strength of the arm supporting the conductors or the line exceeds the strength of the structure supporting the crossarm. In a large ice storm or tornado it is possible for steel towers to collapse. In a large wind storm it is common for wooden structures to be destroyed. Problems also occur on a daily basis. Routinely wood poles and crossarms are snapped when trees fall or are inadvertently cut onto the line.

[2] USPTO U.S. Pat. No. 6,397,545; page 7

Approximately 4.5 million poles are replaced annually.[3] This results in a significant cost to utility and non-utility companies each year. Many of these poles are replaced because they were damaged while in service. Furthermore, when a pole is broken a domino effect may take place. The result is several crossarms are broken for each pole that is broken. Each of these unscheduled events may result in a disruption of service (electric, telephone, CATV, etc.) and will result in charges to repair or replace the structure (pole, crossarm, tower etc.). The owner of the overhead line has the direct cost associated with restoring the line. Other companies and individuals that have lost service will incur costs of their own as the result of a long outage (lost production, spoilage, etc.).

[3] USPTO U.S. Pat. No. 6,397,545; page 7

The breakaway support for overhead lines allows for a much quicker and less costly restoration. Most importantly the structure has not been damaged and does not need to be repaired nor replaced. The repair is infinitely easier. The breakaway support for overhead lines is replaced and the line is reattached. This is a cheaper and quicker restoration of service and extends the life of the structure.

BRIEF SUMMARY OF THE INVENTION

The objective of the breakaway support for overhead lines is to provide a low cost, easy to install, all weather, structurally coordinated overhead line release system. The result of the objective is a quicker and less costly restoration of service for the group maintaining the overhead lines. When the overhead line is exposed to some from of trauma (tree, wind, ice, etc.) the main structural components (poles, towers, crossarms, etc.) should not fail. The present design often results in a structural component failure. Poles break, crossarms snap, towers crumble. The breakaway support for overhead lines prevents damage to the overall system. Only the breakaway support fails. Maintenance crews can clear the line from the trauma (tree, ice, etc.), replace the breakaway support and reattach the line to the undamaged structure. The crews do not have to replace the supporting structure (poles, towers, crossarms, etc.).

This breakaway support for overhead lines can be used on primary or secondary voltage lines. Existing devices are limited to low voltage lines. In order to work properly, the breakaway support for overhead lines does not require the suspension of the service being provided. Communications conductor will still provide service (Power lines will be de-energized by their protective schemes.). Existing devices physically separate the line. Their design ensures that communication service will be lost.

The breakaway support for overhead lines is one entity that has been engineered to have a controlled failure when exposed to excess stress. One end of the breakaway support for overhead lines is secured to the structure (pole, crossarm, tower etc.). This end is a threaded rod of varying length and diameter.

The threaded rod is connected to a weak link. The weak link is a corrosion resistant, stranded link which is engineered to carry the design load and to fail, with a minimum amount of elongation, when design stresses are exceeded. The strands of the weak link will either be straight or slightly (less than ⅛ of a turn over the length of the exposed weak link) rotated clockwise when viewed from the lock washer end. The strands of the weak link will not be rotated counter clockwise when viewed from the lock washer end.

The other end of the weak link is connected to the stabilizing assembly. The nipple on the stabilizing assembly is hollowed out and the other end of the weak link is inserted into the stabilizing assembly. The stabilizing assembly provides (1) protection for the weak link. The breakaway support for overhead lines is usually inserted in a hole drilled or formed in the supporting structure. The nipple on the stabilizing assembly prevents the weak link from rubbing on the inside of the hole in the support structure. The nipple on the stabilizing assembly prevents the strands of the weak link from being damaged. The stabilizing assembly also (2) provides structural support. The breakaway support for overhead lines obviously supports the overhead lines. These overhead lines can be exposed to sever transverse (wind, truck striking line, etc.) loads. These transverse loads on the end of an electric insulator produce a moment. The increased footprint provided by the stabilizing assembly will lower the stress produced in the weak link. For a given transverse load the stresses in the weak link will be lower for a stabilizing assembly with a large footprint than for a stabilizing assembly with a small footprint. As such the breakaway support for overhead lines must be engineered for each application. One design can be used at hundreds of similar locations.

Physically connected to the stabilizing assembly is the overhead line connection point. The overhead line connection point provides a point-of-attachment for an electric insulator or a connector which is then connected to the overhead line (multi-conductor communications line, fiber optic line, individual or multi-stranded power lines, etc.). The connection point will provide resistance to lateral line movement cause by wind and other forces. The connection point will provide resistance to the effects of galloping conductors. When a fault occurs on an electric line, there is a large current surge. A large current surge produces a large magnetic field. When a phase to phase fault occurs we have two large magnet fields that are produced. The magnetic fields cause the conductors to sway. The swaying conductors may make contact and cause their own fault. The design and orientation of the overhead line connection point will help dampen the galloping conductors.

DETAILED DESCRIPTION OF THE INVENTION

Figure 7:
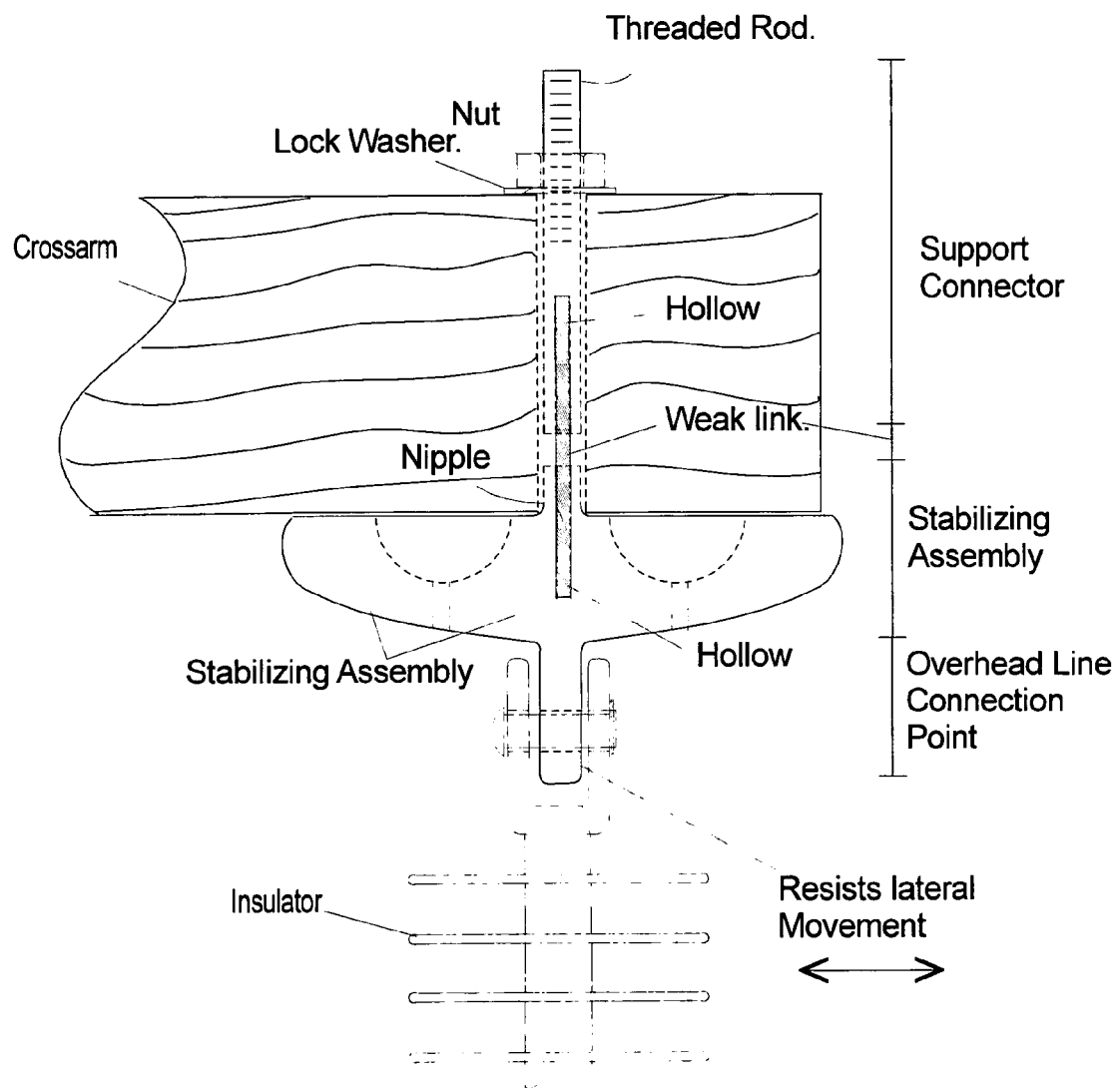
FIG. 7 is a front elevation of the breakaway support for overhead lines installed on a crossarm and supporting a suspension insulator.
Figure 8:
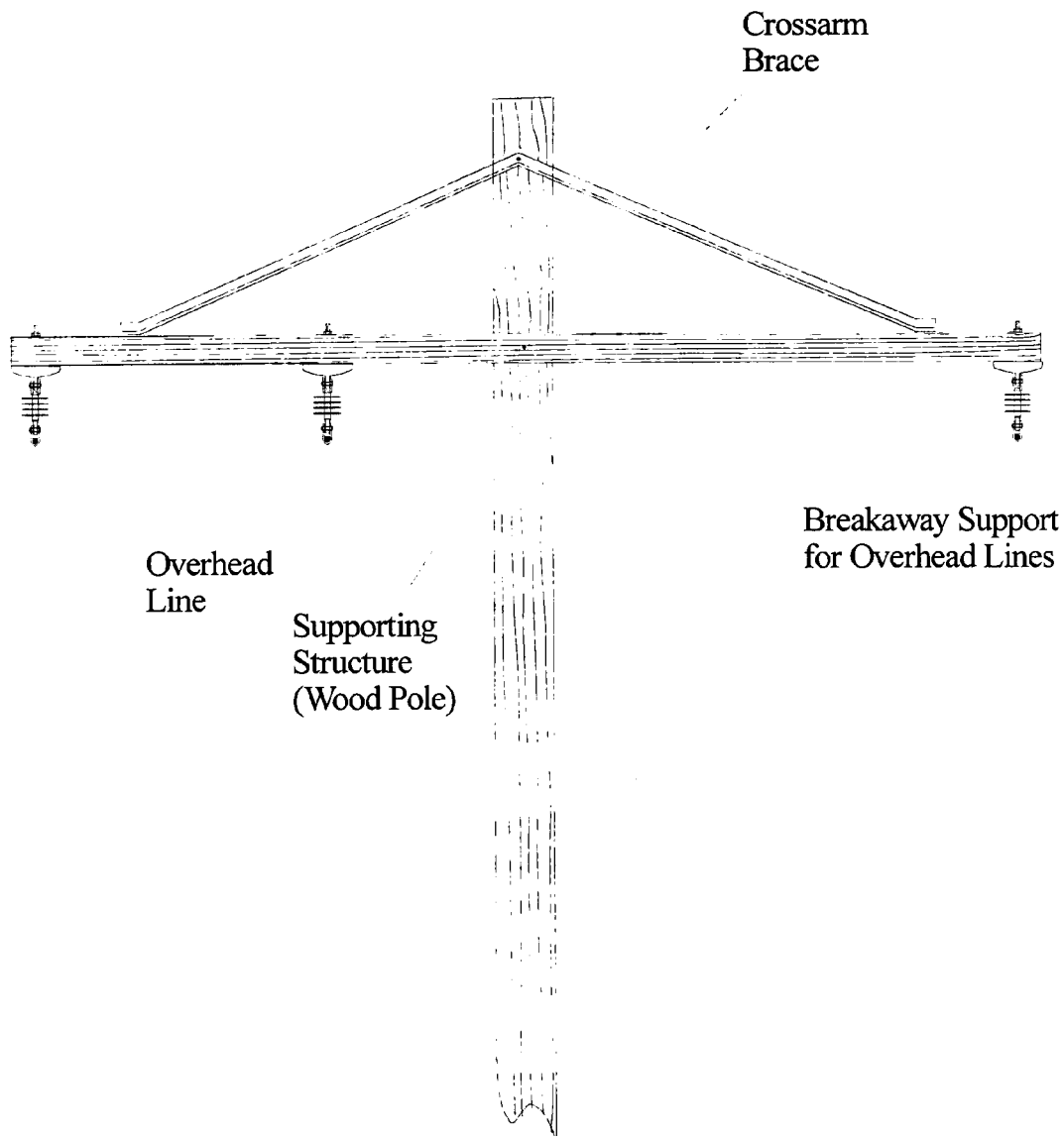
FIG. 8 shows a front elevation of a three phase overhead power line with three breakaway supports for overhead lines installed.
Figure 9:
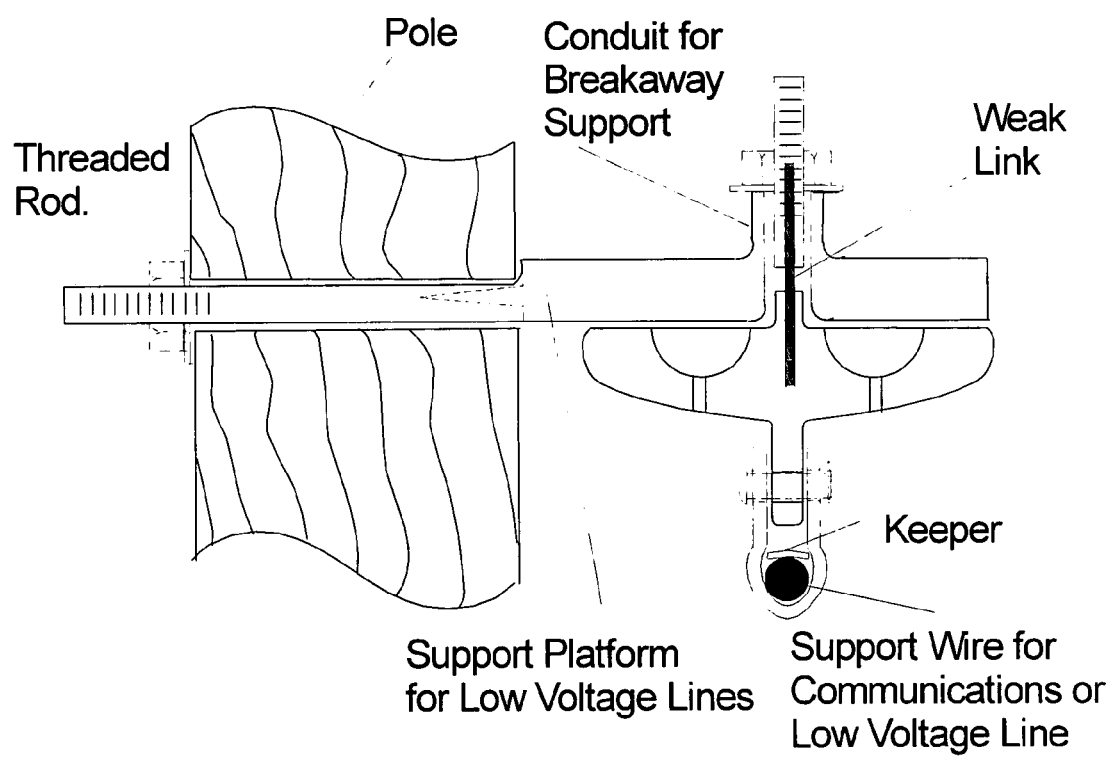
FIG. 9 shows a front elevation of the breakaway support for overhead lines holding a communications cable.
Figure 10:
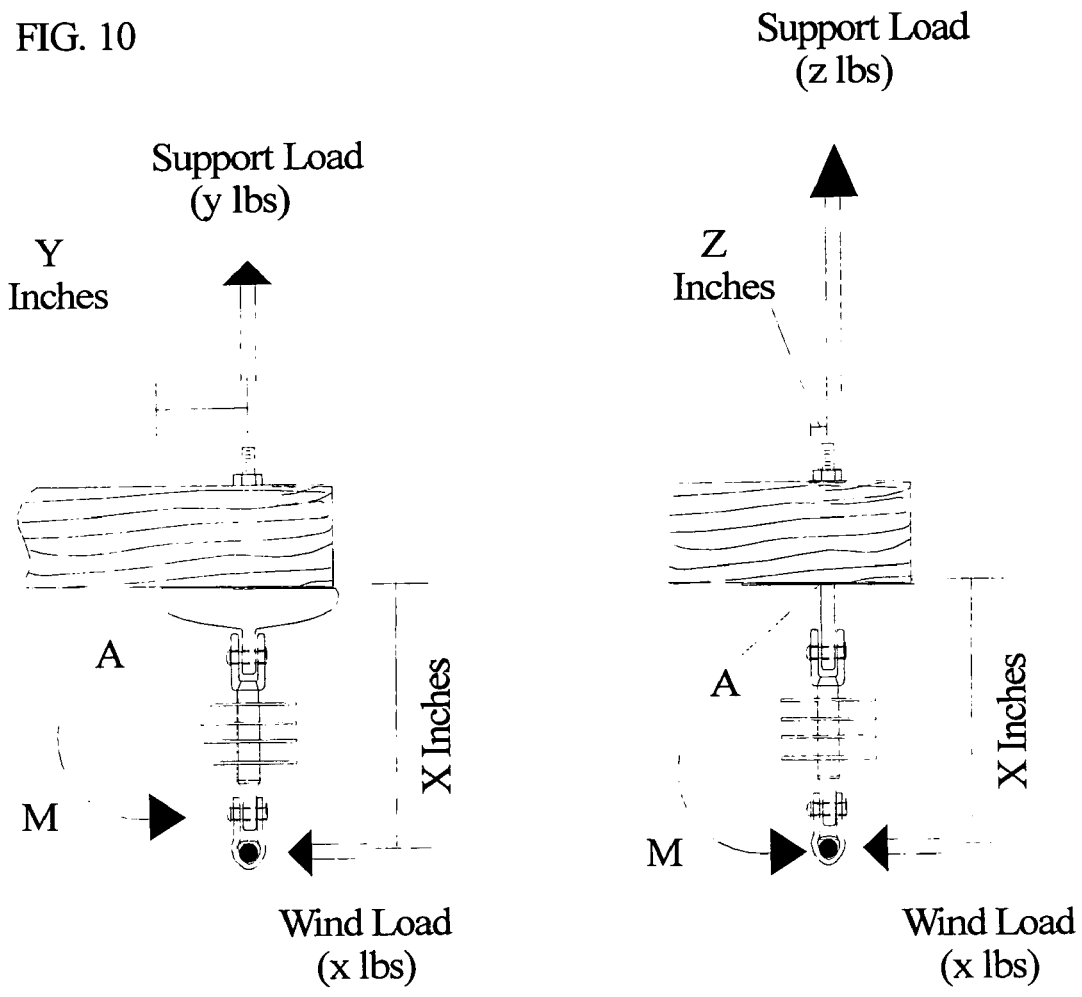
FIG. 10 in combination with Formula 1 show a graphical display of the advantage of a large footprint. The breakaway support for overhead lines has a large footprint. The large footprint lowers the stresses in the support that are the result of a transverse load (wind, tractor trailer truck hitting a low hanging overhead line, etc.). The footprint will vary based on the designed failure load.

An exhaustive search of existing patents failed to identify a product that provides the advantages that the breakaway support for overhead lines provides. Likewise an industry search failed to identify a product that competes with the breakaway support for overhead lines. At least one type of breakaway device has a United States patent. This device (U.S. Pat. No. 5,315,064) is for low voltage (600v or less) application. In order to work successfully, this device requires the service connection to be broken. The breakaway support for overhead lines can work on both high and low voltage electrical lines. Furthermore the breakaway support for overhead lines does not require the service connection to be broken. Lower voltage communications conductors can remain on the ground and continue to provide service to their clients. Furthermore the breakaway support for overhead lines addresses the concern of transverse loading (primarily wind load though other loads are conceivable). A long overhead line has a cross section that captures the wind much like a sail. As the wind speed increases the transverse load on the overhead line increases. The increased load on the overhead line produces an increased load on the pin supporting the line. This wind produces a moment that is carried by the supporting pin. For high voltage electric application the overhead line is on the end of an electric insulator. The line is connected to the insulator, which is connected to the supporting pin, which is connected to the structure. The pin and insulator combination acts as a lever arm. The wind acts as the load. The design of the support will determine the load stresses produced in the pin. The longer the insulator and pin combination the greater the moment produced in the supporting pin (FIG. 10). The breakaway support for overhead lines has a large footprint (FIGS. 3 & 4) that redistributes the moment and lessens the stresses on the support. There are no known products/patents that perform the same function as the breakaway support for overhead lines. The breakaway support for overhead lines can work with virtually all voltage cables. The device can work with varying diameter cables, varying length cables, cables of varying tensile strengths. The device can work with single strand or bundled cable (FIGS. 7-9). The device can work with various line materials (fiber optic, aluminum, copper etc.). The device is easy to manufacture.

Figure 1:
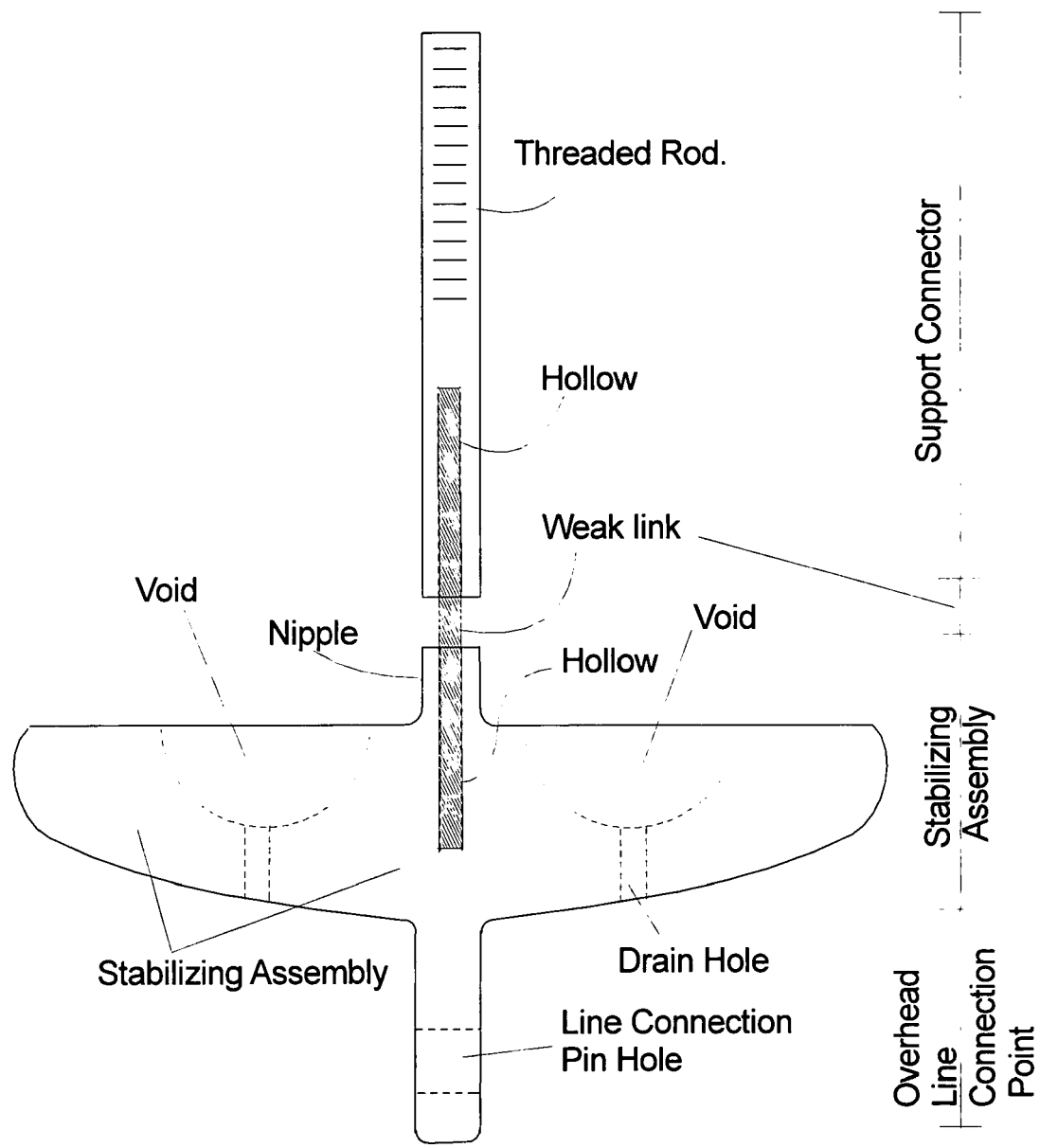
FIG. 1 is a frontal elevation of the breakaway support for overhead lines. This view is suggested for the front page of the patent application.

The breakaway support for overhead lines consists of four components (FIG. 1). Those components are the support connector, weak link, stabilizing assembly and the overhead line connection point. All the components are corrosion resistant.

The support connector is a round, threaded, metal rod of varying diameter and length. The diameter and length will vary depending on the application. Greater supported loads will require larger diameter support connectors. Thicker supporting structures will require longer supporting connectors. The support connectors will be inserted into a drilled or pre-formed hole in the supporting structure. The hole in the supporting structure will have a diameter larger than that of the nipple on the support stabilizer. One end of the support connector will be secured to the supporting structure by a locknut with the application of a cementing agent (Loctite). Depending on the application, a locking pin (not shown) may be inserted transversely through the threaded rod to ensure that the locknut does not loosen. The other end of the threaded rod (support connector) will be hollowed out. The depth of the hollow and the diameter of the hollow will vary based on the application.

A corrosion resistant, stranded section of metal that has limited elongation properties will be inserted into the hollow of the support connector. The stranded piece of metal is the weak link. Over its working life, the breakaway support for overhead lines will experience various traumas. For example small limbs may strike the line. The breakaway support for overhead lines should survive these events with no damage. The weak link will have limited elongation properties. The weak link should not significantly elongate and weaken itself when subjected to minor trauma. Either casting in place or cementing agents along with mechanical crimps will be used to ensure that the weak link does not pull out of the support connector. The diameter, length and choice of material for the weak link will vary with the application. As mentioned, one end of the weak link is inserted and secured to the support connector. The other end of the weak link is inserted, through a nipple, into a hollow of the stabilizing assembly. This end of the weak link will be secured to the stabilizing assembly either by casting in place or by using cementing agents and mechanical crimps. If needed the tail end of the weak link will be lengthened and formed in a "U" shape to ensure that the weak link does not pull free (FIG. 2 only) from the stabilizing assembly. Between the support connector and the stabilizing assembly a portion of the weak link is not embedded in either the support connector or the stabilizing assembly. This is the intended break point. The overhead line connection point supports the line through the stabilizing assembly. When the supported overhead line is exposed to a trauma greater than the tensile strength of the weak link, the weak link fails. The stabilizing assembly and the line fall to the earth. The structure is left undamaged. The repair crew can replace the breakaway support for overhead lines and then reattach the overhead line.

Figure 2:
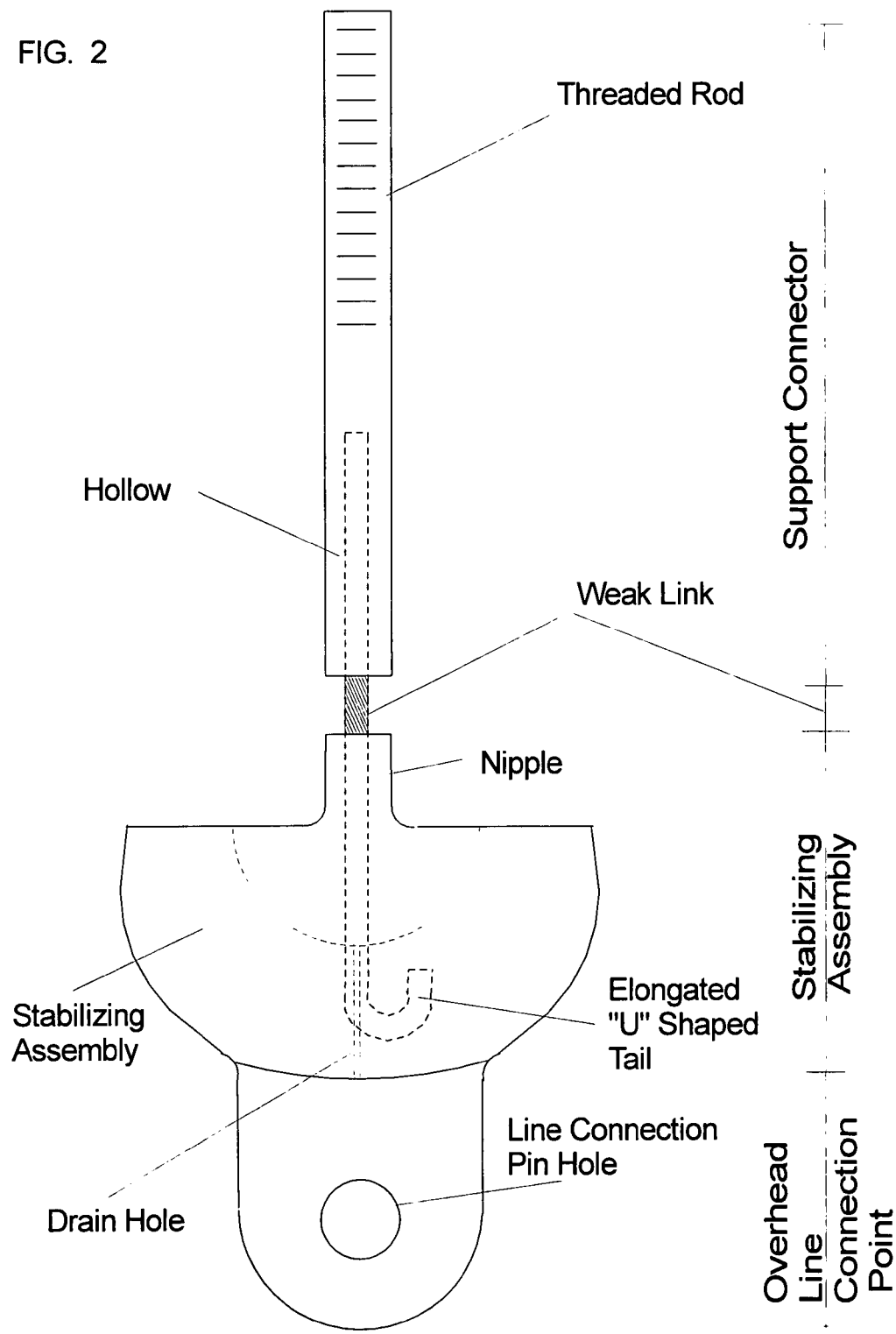
FIG. 2 is a side elevation of the breakaway support for overhead lines with an elongated anchor for the weak link with a "U" shaped tail.
Figure 3:
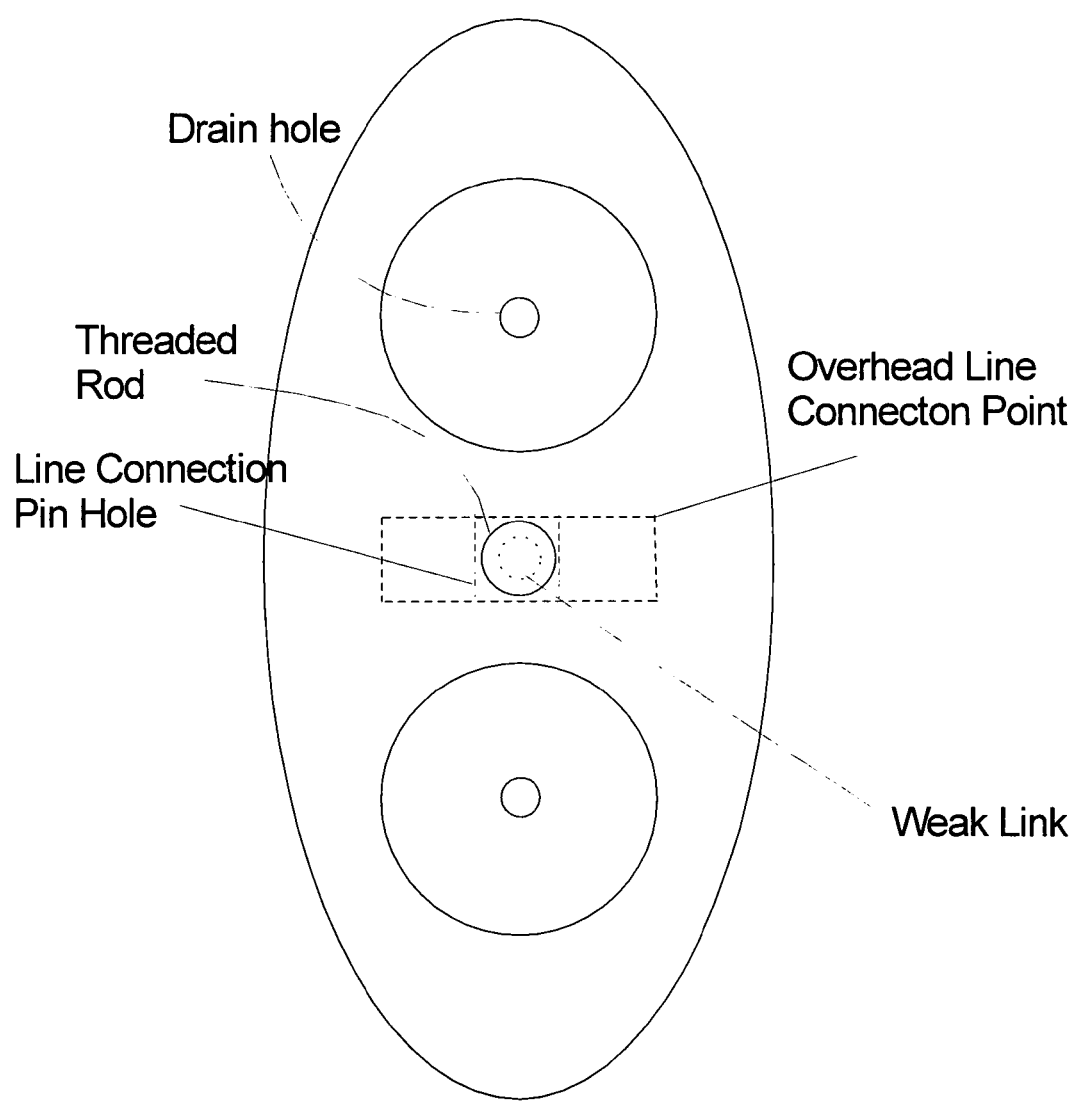
FIG. 3 is a top plan view of the breakaway support for overhead lines.
Figure 4:
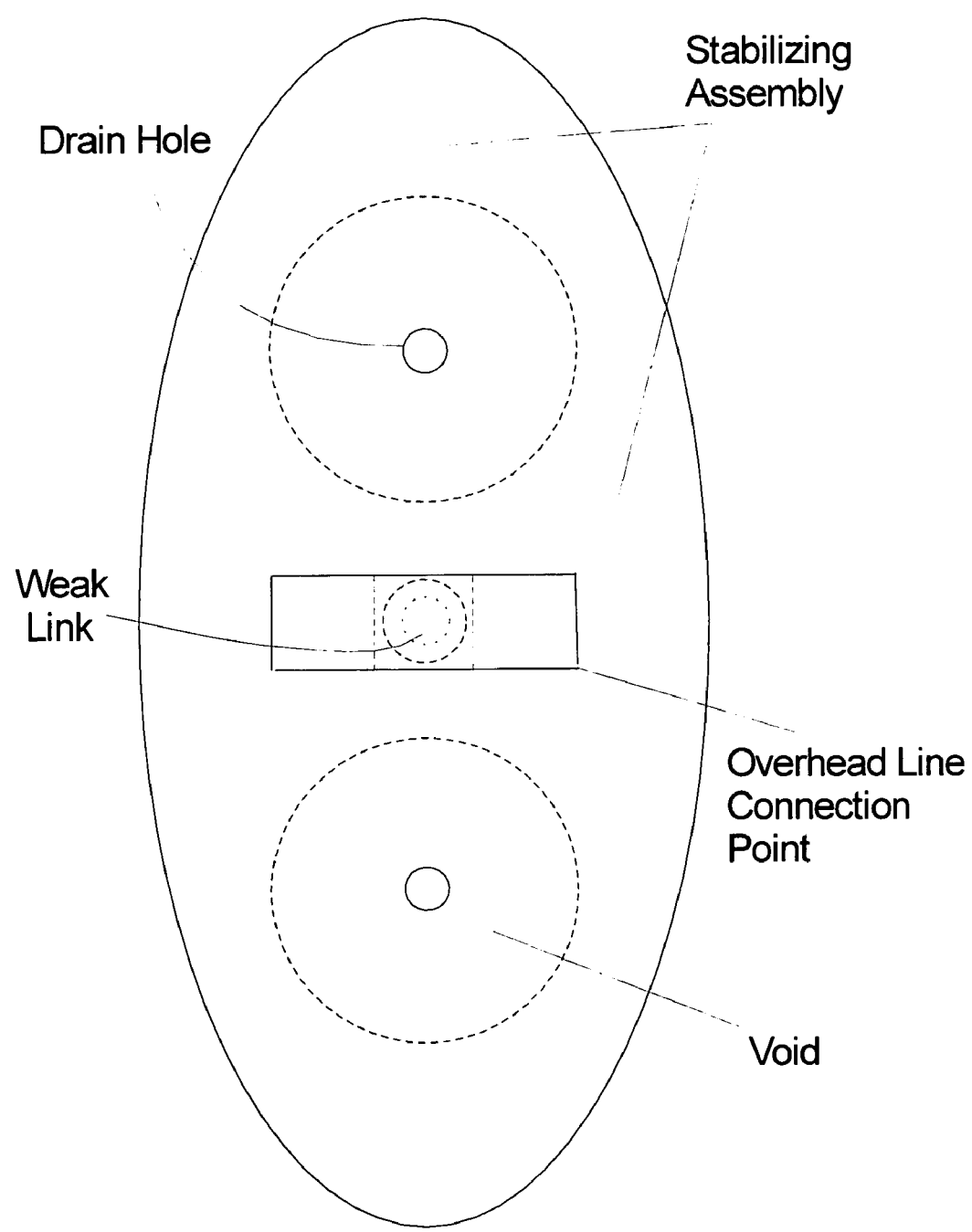
FIG. 4 is a bottom plan view of the breakaway support for overhead lines.
Figure 5:
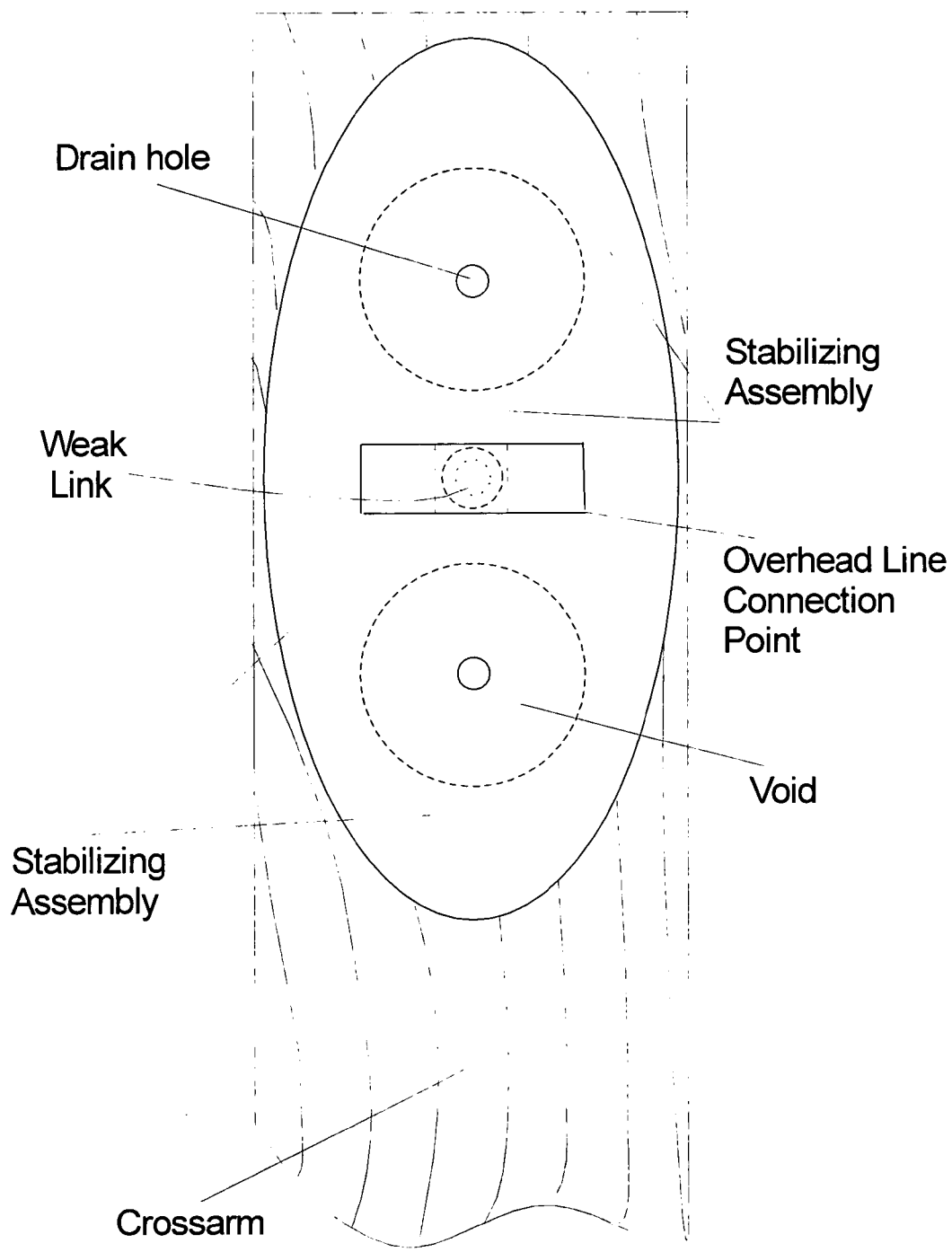
FIG. 5 is bottom plan view of the breakaway support for overhead lines installed on a wooden crossarm.
Figure 6:
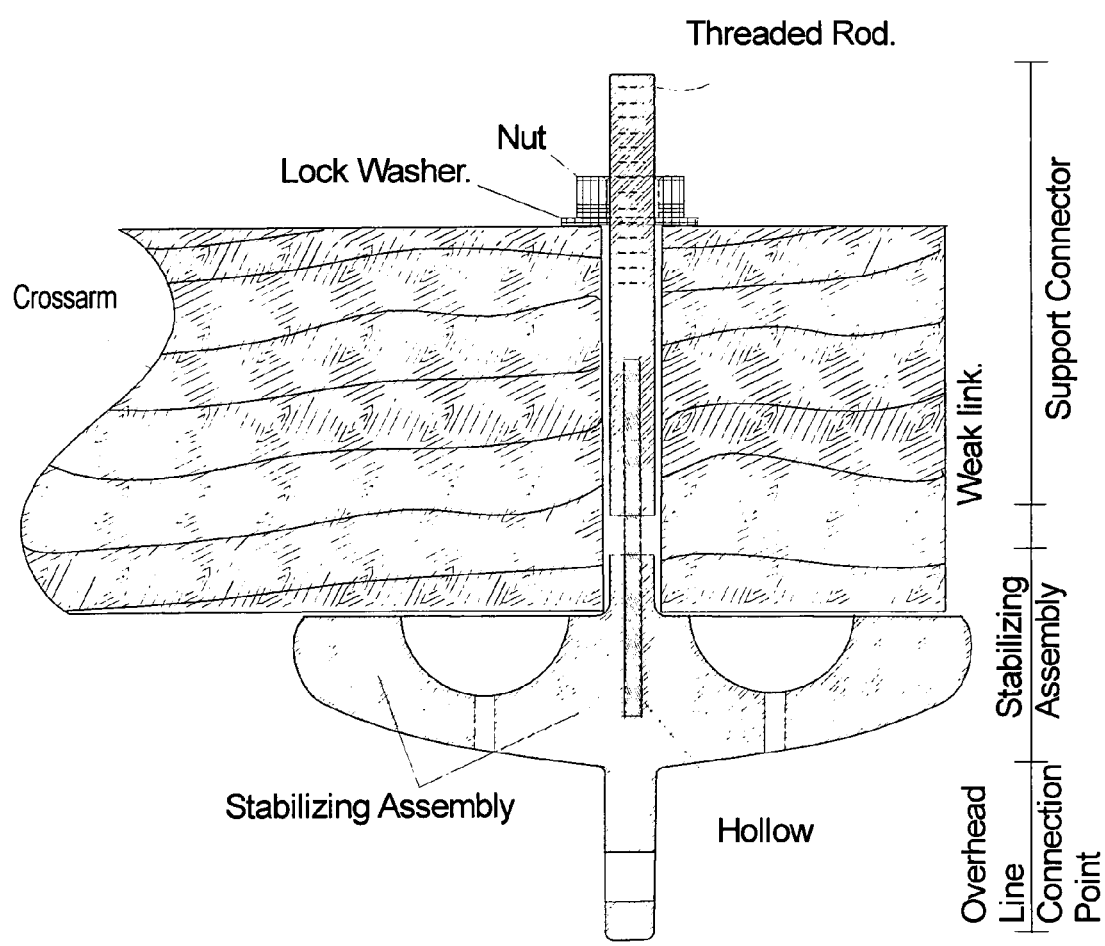
FIG. 6 is cross sectional front view of the breakaway support for overhead lines taken along line 6-6 of FIG. 5.

The stabilizing assembly is metal and is generally oval shaped. The stabilizing assembly is attached to one end of the weak link. The stabilizing assembly has a nipple that is inserted into a hollow in the supporting structure (crossarm, steel structure, pole, etc.). The weak link is inserted into the nipple. The nipple protects the weak link from being abraded by the supporting structure. The nipple also provides a mechanical crimping point. The outer diameter and inner diameter of the nipple will be greater than the diameter of the weak link. The diameter of the nipple will be less than the inner diameter of the hole in the supporting structure. The length and diameter of the nipple will be such as to facilitate rollout. In most instances the length of the nipple will be less than the diameter of the hole in the supporting structure. When the supported line receives excessive trauma the breakaway link is designed to fail (fracture). If the trauma is the result of a force inline with the weak link, the weak link should fail and the stabilizing assembly will be release. This is the intended result. A coordinated failure takes place. The supporting structure is still undamaged. If the trauma is the result of a force perpendicular to the weak link, the nipple should not bind on the inner wall of the supporting structure. The length of the nipple on the stabilizing assemble should not hinder the failure of the weak link nor should it impede the release of the stabilizing assembly. The length and the diameter of the nipple will vary based on the design conditions. The exposed portion of the stabilizing assembly (all but the nipple) will be of sufficient dimensions to resist the moment produced by a moderate horizontal load (wind, tree, etc.). The stabilizing assembly will vary in size depending on the design needs. The footprint of the stabilizing assembly will be designed to facilitate a coordinated failure of the breakaway support for overhead lines (FIG. 10). The stabilizing assembly will be made of corrosion resistant metal. The stabilizing assembly will have voided areas. The voids are symmetrically placed on each side of the stabilizing assembly nipple. These voids are designed to make the assembly lighter while not compromising the structural strength or rigidity of the stabilizing assembly (FIG. 1-3). The stabilizing assembly also has 2 drain holes. The drain holes are at the bottom of the trough of each voided areas. The drain holes are ¼ inch in diameter and extend from the bottom of the trough of the voided areas completely trough the stabilizing assembly. Drain holes prevent the voided areas from filling with water (FIGS. 1 & 4).

The overhead line connection point allows the breakaway support for overhead lines to interface with the existing line connectors. The connection point is designed and oriented to provide resistance to swaying overhead lines. The connection point is of sufficient strength and durability to resist these forces (FIG. 7).

I claim:

1. A single use breakaway support assembly for securing overhead lines to a supporting structure comprising:
    a support connector affixed to said supporting structure for securing the assembly to said supporting structure, said support connector having a solid portion and a hollowed portion;
    a stabilizing assembly, said assembly having an overhead line connection point; and
    a stranded connection member mounted at one end in said hollowed section of said support connector and at the other end in said stabilizing assembly;
    whereby said connection member will yield when force is applied to said overhead lime connection point.

2. The support assembly of claim 1 wherein the hollowed portion of said support connector is disposed to internally receive a connection member having a diameter less than that of said support connector.

3. The support assembly of claim 1 wherein said overhead line connection points is an independent component secured to said stabilizing assembly.

4. The support assembly of claim 1 wherein the connection member has a lower tensile strength than the other components of the breakaway support assembly.

5. The support assembly of claim 4 wherein the stabilizing assembly comprises:
    a generally oval shaped metal component; and
    a nipple protruding from said metal component,
    whereby said nipple prevents abrasion of the connection member by the supporting structure.

6. The support assembly of claim 4 further having a means for limiting the lateral movement of the overhead lines.

7. The support assembly of claim 4 wherein said connection member will only yield to force in excess of the tensile strength of said connection member.

8. A breakaway support assembly for securing overhead lines to a supporting structure comprising:
    a support connector attached to said supporting structure for securing the assembly to the supporting structure;
    an overhead line connection point;
    a stranded link member secured to said support connector to one end and secured to the overhead line connection point at the other end; and
    a means for controlling the level of force at which the link member will yield;
    whereby said link member will yield when force in excess of the tensile strength of said link member is applied to said overhead line connection point.

9. A breakaway support assembly for securing overhead lines to a supporting structure comprising:
- a support connector attached to said supporting structure for securing the assembly to the supporting structure;
- an overhead line connection point;
- a stranded link member secured to said support connector to one end and secured to the overhead line connection point at the other end; and
- a stabilizing assembly which includes an overhead line connection point, one end of said stabilizing assembly disposed to receive and secure one end of said link member, the other end of said stabilizing assembly includes said overhead line connection point;

wherein the stabilizing assembly comprises:
- a generally oval shaped metal component; and
- a nipple protruding from said metal component, whereby said nipple prevents abrasion of the link member by the supporting structure.

10. The support assembly of claim 9 further having a means for limiting the lateral movement of the stabilizing assembly.

11. The support assembly of claim 9 wherein said stabilizing assembly includes a plurality of symmetrical cavities for decreasing the weight of said stabilizing assembly.

12. A single use breakaway support assembly for securing overhead lines to a supporting structure comprising:
- a support connector for securing the assembly to the supporting structure wherein said support connector is threaded at the end in contact with said supporting structure and a portion is hollowed out at the other end;
- a stabilizing assembly which includes an overhead line connection point; and
- a link mounted at one end in said hollowed section of said support connection and at the other end in said stabilizing assembly;

whereby said link will yield when force is applied to said overhead line connection point.

13. The support assembly of claim 12 wherein the link is a stranded metal section with a lower tensile strength than the other components of the assembly.

14. A single use breakaway support assembly for securing overhead lines to a supporting structure comprising:
- a breakaway element that has a lower tensile strength than the other components of the breakaway support assembly;
- a means for attaching said breakaway element to the overhead line;
- a means for securing said breakaway element to the supporting structure; and
- a means for controlling the level of force at which the breakaway element will yield;

whereby said breakaway element will yield upon the application of a load less than that required to damage the supporting structure thus preventing damage to the supporting structure when unintended force is applied to said breakaway support assembly.

* * * * *